United States Patent Office 2,702,403
Patented Feb. 22, 1955

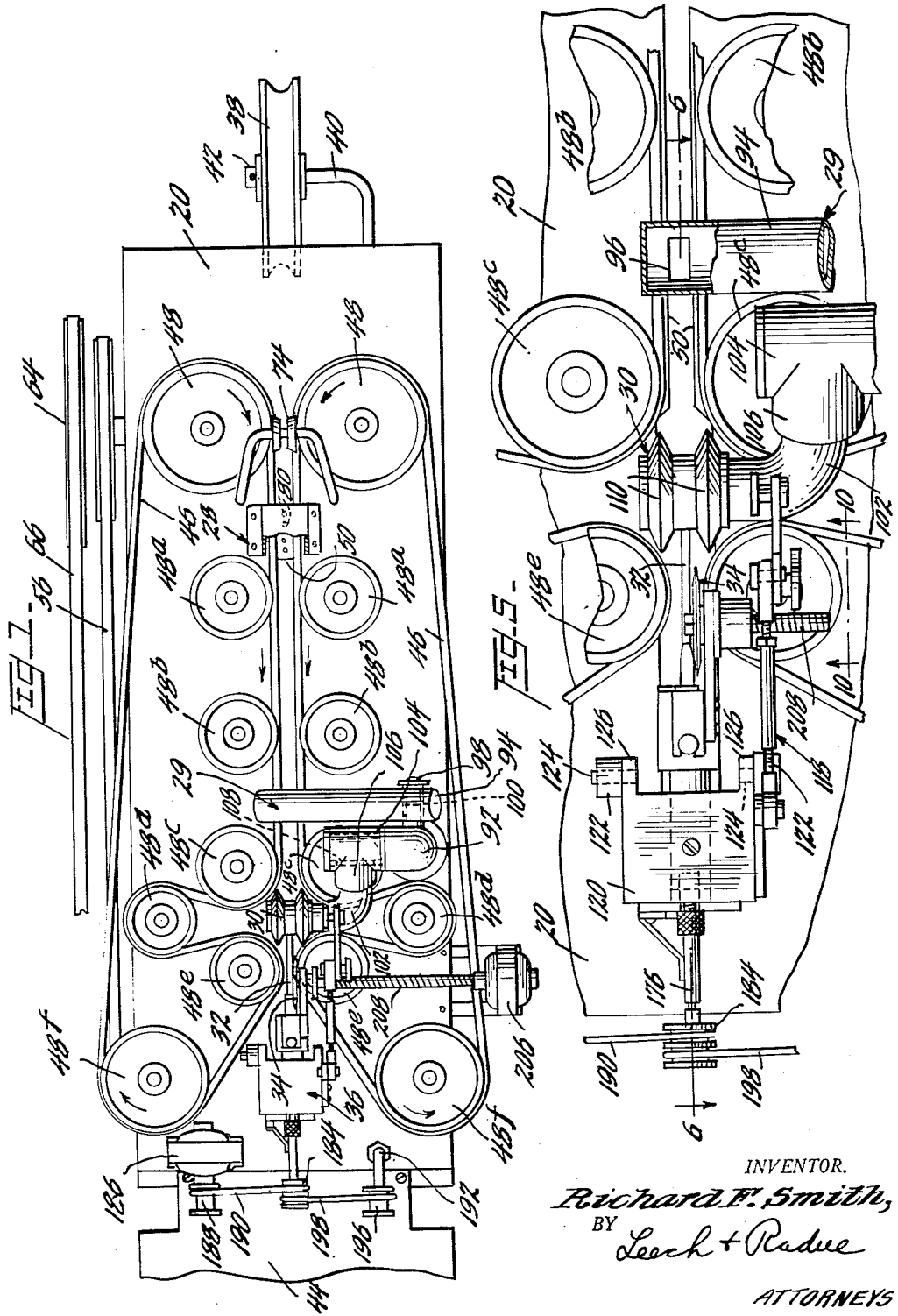

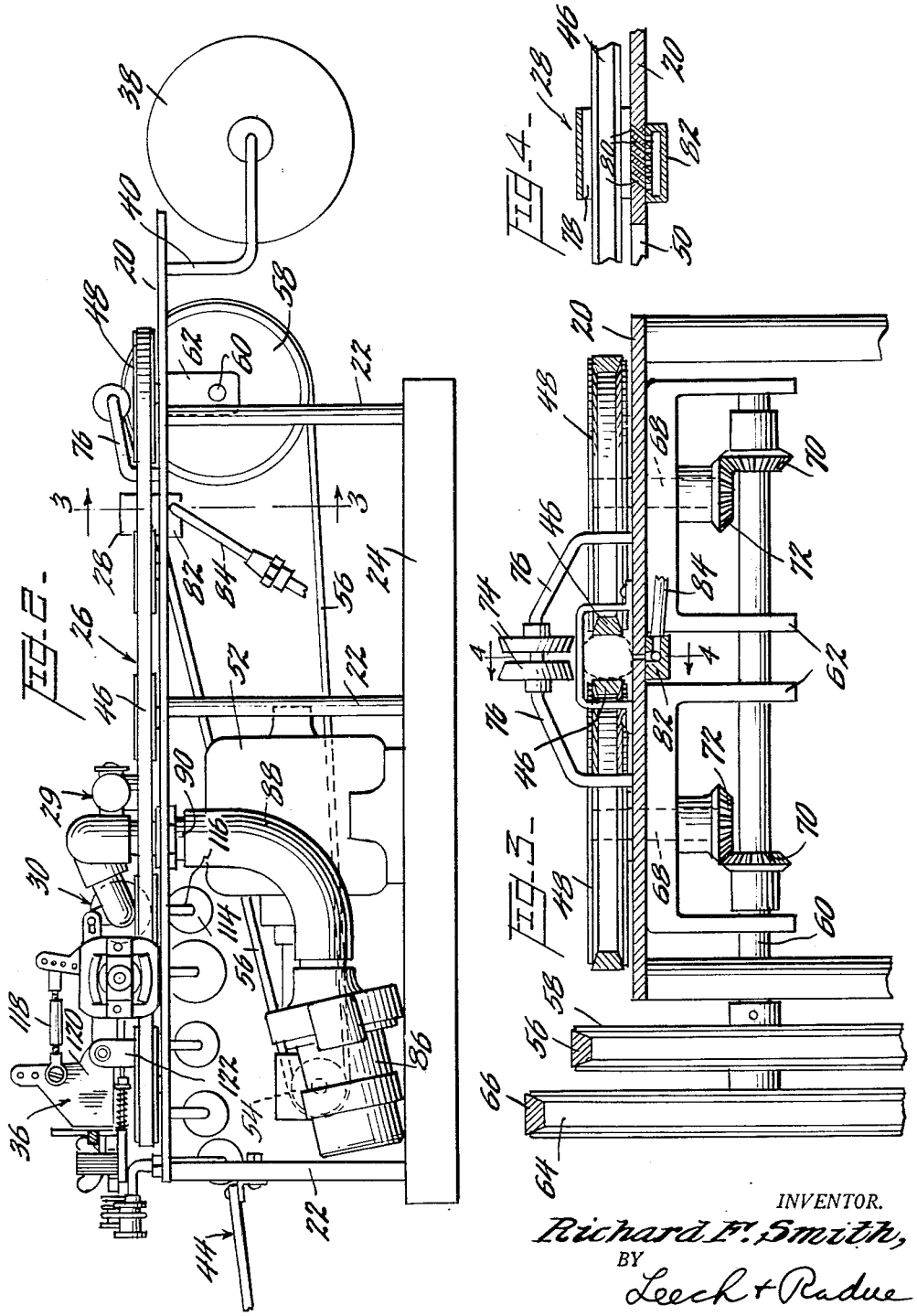

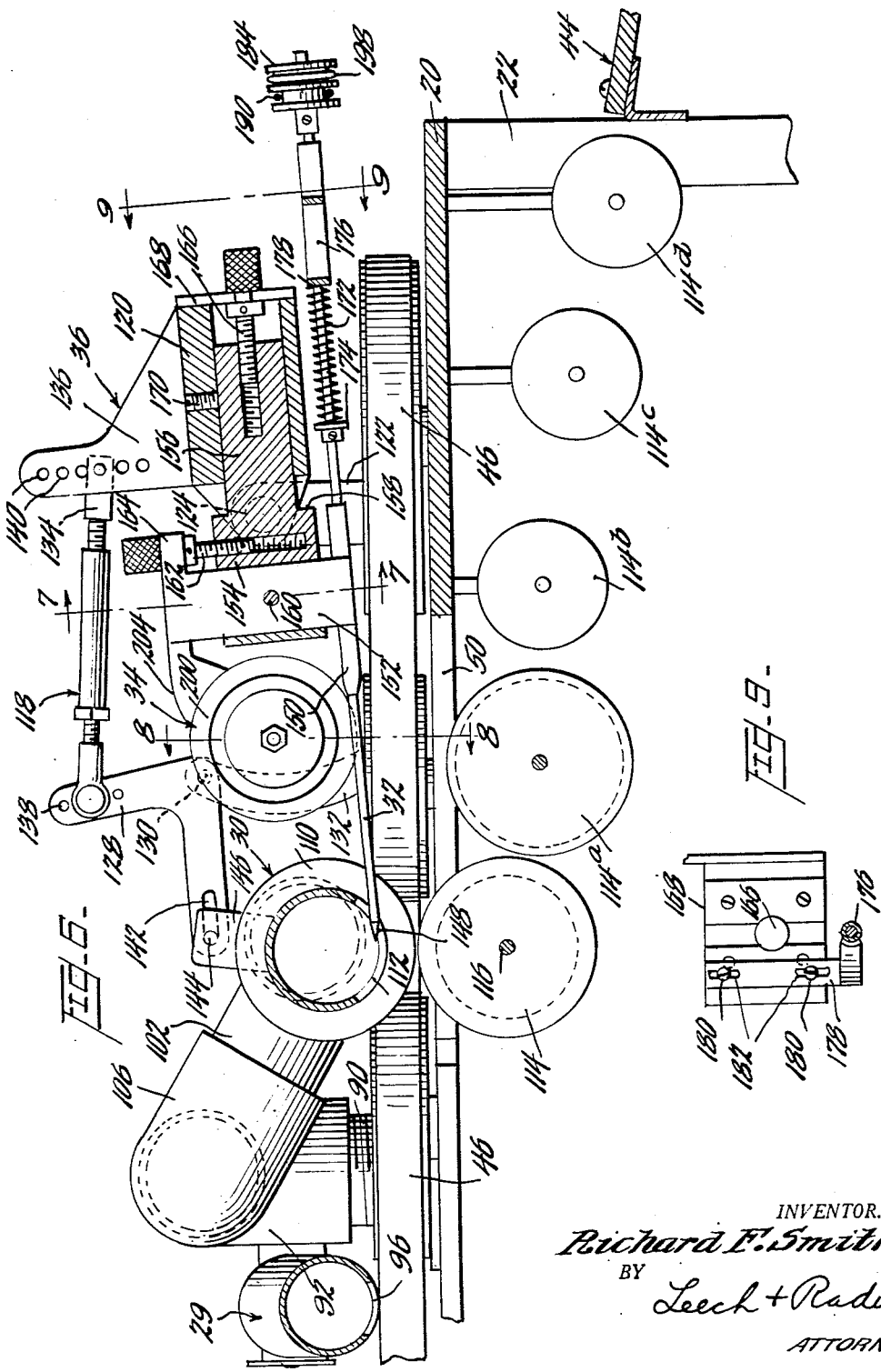

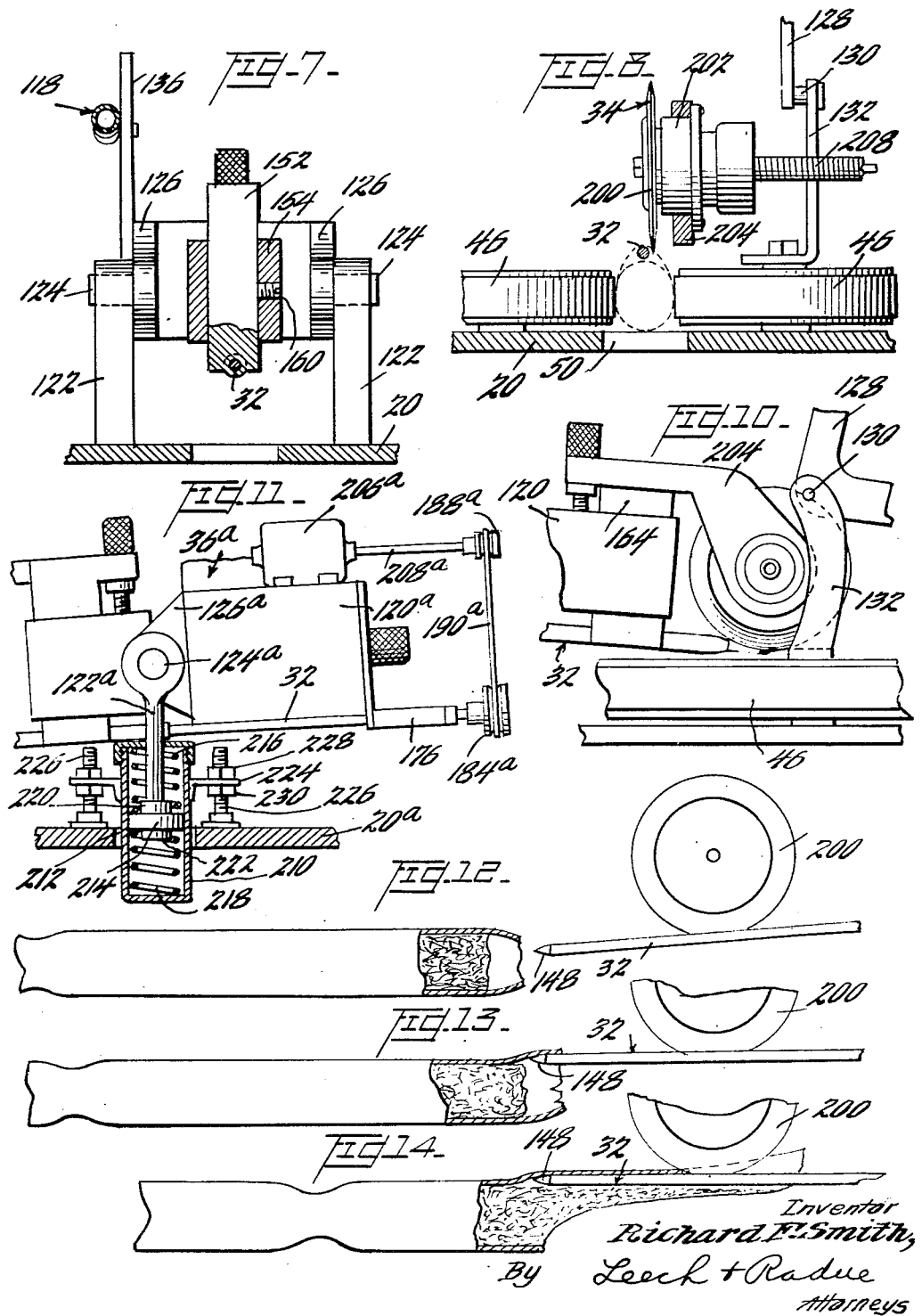

2,702,403

SAUSAGE SKINNING MACHINE

Richard F. Smith, Carrollton, Va.

Application January 8, 1951, Serial No. 204,857

17 Claims. (Cl. 17—1)

This invention is directed to important improvements in sausage skinning. It is primarily concerned with new procedures and new apparatus for loosening and cutting for removal of the casings or skins of frankfurters and similar sausage products.

The novel method and apparatus to be disclosed are primarily intended for use in the manufacture of skinless frankfurters, although they may be used to advantage for more general purposes. In the manufacture of skinless frankfurters an extended length of casing (18 feet or longer) of any appropriate material such as cellulosic "cellophane" is stuffed with meat and then subdivided into links by twisting the casing or wrapping it with a length of string at regular intervals. This length of links is next cooked, smoked and otherwise cured before the casing skin is removed and the product marketed as the familiar skinless frankfurter or hot dog. This processing leaves a slightly hardened layer or natural skin on the frankfurters that will protect them for retail selling.

At present practically all deskinning of frankfurters and the like is done by hand cutting and spiral unpeeling of the cellulosic casing material. A machine has recently been patented for performing this hand operation. However, the lack of uniformity in the sausage links and any casing material makes for difficult and relatively slow operation of this machine.

Other previously known and patented casing removing machines have used leaders in the form of nozzles, either wholly fixed or limited in movement to an up and down swinging of the leader end, for lifting the casing for cutting. With such rigidity of mounting there is a real problem of loss of product by reason of damage to the sausage meat when a leader or probe plows into it.

It is the general object of this invention to provide a sausage skinning machine with a yielding needle member or probe that is aligned and inserted between the sausage and the casing without damage to the sausage meat, and that is rotated to facilitate insertion and to tension the casing in the cutting area.

More specifically it is intended to provide a sausage casing removing machine having a casing separating needle member that is rotated, reciprocable in response to engagement with the sausage meat, and pivoted for movement toward and away from the sausage links fed to it, and a cooperatively arranged cutter.

Another specific object is to provide a sausage casing slitting machine of the character described with suction means for lifting a portion of the skin or casing as a length of sausage links is held and passed to the needle member and cutter by feeding means.

This invention also comprehends a method of skinning a length of links of frankfurters or the like by inserting a rapidly rotating needle member lengthwise between the skin and the meat and slitting the skin alongside the needle member on the side tensioned by needle member rotation.

These and other features of novelty contributing to efficiency in operation, avoidance of damage to the sausage meat, and adaptability to varying conditions of operation will be more fully understood from the following detailed description of a preferred embodiment, when taken in connection with the accompanying drawings, in which:

Fig. 1 shows in top plan view a machine for carrying out the purposes of this invention;

Fig. 2 is a side view of the machine of Fig. 1 with certain parts omitted and showing the manner in which the apparatus is mounted on an operating table;

Fig. 3 is an enlarged cross-sectional view taken on line 3—3 of Fig. 2 and showing details of the sausage feeding means;

Fig. 4 is a partial vertical section taken on line 4—4 of Fig. 3 and showing details of the sausage skin lubricating means;

Fig. 5 is an enlarged partial plan view of the machine of Fig. 1 with certain parts broken away or sectioned;

Fig. 6 is a still further enlarged vertical section taken on line 6—6 of Fig. 5 to show more fully details of the suction means, needle member, cutter, and their supporting and adjusting means;

Fig. 7 is a partial vertical section taken on line 7—7 of Fig. 6 showing other details of the supporting and adjusting means;

Fig. 8 is a vertical section taken on line 8—8 of Fig. 6 and illustrating the relation of the cutter to the needle member while a sausage skin is severed;

Fig. 9 is a vertical section taken on line 9—9 of Fig. 6 and illustrating one of the adjustments for the needle member;

Fig. 10 is an enlarged fragmentary side elevation taken on line 10—10 of Fig. 5 and illustrating another adjustment for the needle member;

Fig. 11 shows in partially sectioned side elevation a modified mounting and arrangement of the needle member; and Figs. 12, 13 and 14 are sequential diagrammatic elevations of the needle member and the cutter showing progressive cooperative relations in the cutting of a sausage skin.

Referring to the drawings, the assembly views of Figs. 1 and 2 show the various parts of a preferred embodiment of sausage skinning apparatus constructed in accordance with the principles of the present invention. A continuous length of sausage links to be skinned is moved from the right end to the left end of the apparatus or machine illustrated in Figs. 1, 2 and 5. It is believed that this machine can be most readily understood if an outline description of its principal components is first presented.

The machine as shown comprises a table 20 supported at its ends and sides by a plurality of standards 22 extending upwardly from a base member 24. The length of sausage links to be skinned is received and moved lengthwise of the table 20 by continuously operating sausage feeding means 26 that laterally grip the links. To prevent undesirable friction and to maintain the skin or casing in optimum condition a lubricating means 28 is arranged to act on the links shortly after they enter the feeding means 26.

While still carried by the feeding means 26 the links are next operated on by a pivoted suction device 29 and then a suction roll means 30 under which they pass before a needle member 32 enters the open end of the first link and passes lengthwise between the skin and the cured sausage meat. A cutter 34 having a fixed relation to the needle member 32 slits a portion of the skin spaced from the sausage meat by said member.

Both the needle member 32 and the cutter 34 are carried by a pivoted mounting means 36 that is interconnected with the suction roll means 30.

The sausage links to be skinned are delivered to the table 20 by a free running grooved feed wheel 38 carried by a bracket 40 secured to the underside of the table and formed with a horizontal wheel shaft 42.

The slit length of links is discharged continuously at the other end of the table to a sausage receiving means 44 of suitable construction.

*Sausage feeding means*

The sausage feeding means 26 previously referred to generally comprises a pair of cooperating continuous belts 46, 46 of rubber-like material that can be readily maintained in a sanitary condition (Fig. 1). Each belt is run around a system of grooved pulleys, two of which 48, 48 are shown in detail in Fig. 3. The corresponding pulleys of each system are 48, 48a, 48b, 48c, 48d, 48e and 48f. Each pulley is grooved to receive the tapered belt cross-section in friction driving relation and is mounted for rotation in a plane that is parallel to and closely spaced from the top of table 20. As shown in Fig. 1, the belt pulleys of each system are arranged to provide parallel opposed runs of belts 46, 46 lying a short distance inwardly from the edges of a central longitudinal slot formation 50 of the table 20. Figs. 3 and 5 illustrate the manner in which the opposite sides of the sausage links are lightly but firmly gripped by the opposed belts 46, 46 and supported by the slotted table formation 50 as they are fed therealong.

From Figs. 1, 4, 5 and 6 it will be observed that the slot formation 50 extends from adjacent the lubricating means 28 to a short distance beyond the cutter 34. It will also be noted that the arrangement of pulleys 48c, 48d and 48e provides a free space for operation of suction roll means 30 and the point end of needle member 32. The opposed portions of belts 46, 46 on pulleys 48e, 48e continue the gripping and feeding action on the link portion being slit by the cutter 34 before the link is carried downwardly through the left end of slot formation 50.

Driving power for the feeding belts 46, 46 is derived from an electric motor 52 (Fig. 2) having a power take off pulley 54 connected by a drive belt 56 with a driven pulley 58 keyed on a power shaft 60 (Fig. 3) supported horizontally beneath the table 20 by a pair of bearing brackets 62, 62.

An auxiliary unit drive may also be taken from the power shaft 60 by an outer pulley 64 driving a belt 66 (Fig. 3).

Each of the drive belt pulleys 48, 48 is suitably mounted on a vertical shaft 68 (Fig. 3) projecting below the table 20 toward power shaft 60. A pair of cooperating bevel gears 70, 72 is arranged within each bearing bracket 62, the pairs being respectively secured to shaft 60 and one of the shafts 68 and reversely arranged so that the pulleys 48, 48 turn in opposite directions and drive both belts 46, 46 in the same direction toward the left or slitting end of the table 20, as clearly shown by arrows in Fig. 1.

The length of sausage links is maintained in proper relation in the zone of introduction to the feed belts 46, 46 by a divided, free running overhead roller 74 carried by a table mounted bracket 76 spanning the parallel runs of said belts, as shown in Figs. 1 and 3. The roller 74 is centered over the said parallel belt runs and arranged to bear firmly on the top of the sausage links when the latter are supported by the table 20 and engaged by the opposed belts 46, 46 in the manner illustrated in Fig. 3.

*Lubricating means*

Referring to Figs. 3 and 4 in particular, the skin lubricating means 28 is shown in its preferred position intermediate the rollers 48, 48 and the adjacent end of slot formation 50 in the sausage feed path on the table 20. The means 28 includes an elongated hood 78 with ample clearance for the belts 46, 46 and the sausage links fed thereby. Water or any other suitable lubricating fluid is injected into the space beneath the links by means of a plurality of nozzle openings or jets 80 formed in the table 20. The openings 80 extend in a central line and are inclined toward the oncoming links, that is, in opposition to the direction of feeding. Water under pressure is supplied from a depending manifold 82 connected with a fluid pressure supply conduit 84 located beneath the table 20.

*Suction device and suction roll means*

The pivoted suction device 29 and the suction roll means 30 are both connected with a suction unit 86 of commercial construction conveniently mounted on the base member 24 in the manner indicated by Fig. 2. This suction unit 86 includes a housed electric motor and a connected blower type fan, the intake side of the latter being connected by a large conduit 88 with a suction pipe 90 extending through and secured to the table 20.

Referring to Fig. 1 as well as Fig. 2, it will be seen that the pipe 90 merges with a horizontally extending suction manifold 92 having the pivoted suction device 29 connected with one end and the suction roll means 30 with the other.

Attention is now directed to a tubular pipe 94 having its ends closed and comprising the principal part of device 29. The inner end of tubular pipe 94 extends over the slotted table formation 50 and has an elongated aperture or opening 96 on its under side, and preferably of a rectangular shape in parallel, vertical alignment with said formation. The outward end of the suction manifold 92 is provided with a laterally extending pipe member 98 projecting through the outer end portion of the tubular pipe 94 and having a closed outer end and providing a bearing pivot therefor. This pivot connection includes conventional rotary seal means, the details of which do not require showing. As indicated in Fig. 1, the portion of pipe member 98 within the pipe 94 is formed with one or more openings 100 sized and arranged for communication (through pipe 94) with slot 96 throughout the operative pivotal range of pipe member 94.

The details of the suction roll means 30 are shown most clearly in Figs. 1 and 5. This suction means 30 comprises a conduit arm 102 of elbow shape pivotally connected with and mounted on the inner end portion of the suction manifold 92 by means of a suitably sealed rotary sleeve 104 having a side opening branch 106. The bearing end portion of the suction manifold 92 is provided with one or more large openings 108 arranged for communication with the sleeve branch 106 throughout the operative pivotal range of conduit arm 102.

A spaced pair of lightweight rolls 110, 110 are mounted on the inner end portion of elbow arm 102 for free rotation, and are secured thereon by any suitable means. The inner marginal faces of the rolls 110 are beveled as shown to form an inwardly tapering groove making rolling engagement with the sausage links passing thereunder. A transverse slot 112 (Fig. 6) is formed in the underside of the end portion of elbow arm 102 between the rolls 110 for the purpose of exerting a suction, lifting force on the adjacent part of the sausage skin while the sausage link is held by the feeding belts 46, 46.

As seen in Fig. 6 a supporting roll 114 is rotatably carried by a bracket 116 on the underside of table 20 so that the upper part of said supporting roll projects into slot formation 20 to carry the sausage links beneath the suction slot 112 in the lengthwise space between the opposed feeding portions of belts 46, 46.

Other aligned and similarly mounted supporting rolls 114a, 114b, 114c and 114d are arranged to transfer the casing-slit length of sausage links to the receiving means 44.

Due to its pivotal mounting the suction roll means 30 will readily raise and lower in response to lengthwise variations in the sausage links engaged by rolls 110, or to any lesser height of the skin connections between successive sausage links.

*Needle member and cutter assembly*

It has been previously pointed out that the needle member 32 and cutter 34 are supported for movement by the pivoted mounting means 36, and that the suction roll means 30 and said mounting means are interconnected. Referring to Figs. 5 and 6, it will be further observed that the interconnection is through an adjustable linkage 118, the purpose of which is to cause the needle member 32 and the cutter to move up or down in response to similar movement of the separately pivotally mounted suction roll means 30. This correlated movement through adjustable linkage means is an important feature of the present invention.

As shown in Fig. 5, the mounting means 36 includes a generally rectangular metal block 120, the inner end of which relative to the discharge end of table 20 is pivotally mounted in trunnion fashion for movement about a horizontal axis extending perpendicularly across the line of feed of the sausage links. A spaced pair of vertical ears 122, 122 extend upwardly from the table 20 and receive pivot shafts 124, 124 extending into spaced, projecting arms 126, 126 at said inner end of block 120.

The connecting linkage 118 has a crank member 128 with a pivot connection 130 between its elbow portion and the upper end of an upstanding table mounted bracket 132 laterally spaced from cutter 34 and slot formation 50 (Fig. 8). An adjustable length link or turnbuckle 134 connects the upright arm of the crank member 128 with a plate arm 136 extending above the corresponding side of the block 120, with said upright crank arm and said plate arm being formed with series of spaced openings 138 and 140 respectively for varying or any other, link, the conduit arm 102 pivots responsively and acts through the linkage 118 and the pivoted mounting means 36 to elevate the needle member 32 into horizontal alignment with the top of said link (Fig. 13) immediately after the needle point 148 has entered the open end of its casing.

The rapid rotation of the pointed needle member 32 facilitates smooth entry between the sausage and the casing, but if appreciable resistance is encountered the needle member 32 readily yields in a withdrawing direction against the light coil spring 172 on its head end, thus averting plowing into or other damage to the sausage meat.

The remainder of the length of links follows in passage under the needle member 32 with the central top portion of the casing being continuously separated from the sausages, and the alignment of the needle member being continually monitored by the action of the suction roll means 30.

It is not until the needle member 32 is well inserted under the casing that the high speed slitting or cutting disc 200 operates on the needle tensioned side of the casing (Figs. 8 and 14).

When the modified needle member supporting means of Fig. 11 is employed, vertical motion is added to the pivoting, rotating and reciprocating motions of said needle member 32.

After the links leave the cutter 34 they pass downwardly through the adjacent end portion of the table slot 50 while still lying in the untwisted, continuously slit length of casing or skin. Fig. 9 indicates the series of roller means that may be used to discharge said length to receiving means 44 for removal and separation of casing and sausages.

There has thus been provided by this invention sausage skinning method and apparatus that will efficiently and rapidly slit the casing or skin of a length of frankfurter or similar sausage links without any damage to the meat itself and with a minimum of skill and attention from an operator.

It will be entirely obvious that greater machine capacity and utilization of the time of an operator can be achieved by the simple expedient of assembling a number of the machines disclosed herein in a parallel arrangement with common power drives for the link feeding means, the suction devices, and machine auxiliaries such as destringers and means for removing the sausages from the slit casing or skin.

It will be further understood that only a preferred embodiment of the invention has been disclosed for the purposes of illustration, and that numerous changes can be made in details of procedure, construction and arrangement of parts, without departing from the spirit and scope of the invention, as defined in the following claims.

Having thus described my invention, what I claim as novel and desire to secure by Letters Patent is:

1. In a machine for removing casings from sausages, a needle member for insertion between the casing and the sausage meat, means supporting said needle member for rotation about its longitudinal axis, means rotating the supported needle member, and a cutter maintained in cutting relation closely adjacent one side of said needle member.

2. In a machine for removing casings from sausages, a needle member for insertion between the casing and the sausage meat, means supporting said needle member for rotation about, and reciprocation along the line of, its longitudinal axis, means rotating the supported needle member, and a rotary cutter maintained in cutting relation closely adjacent one side of said needle member.

3. In a machine for removing casings from sausages, a needle member for insertion between the casing and the sausage meat, means supporting said needle member for rotation about its longitudinal axis, a pivotal mounting for said needle member supporting means, said pivotal mounting having its axis of pivoting perpendicular to said needle member and approximately aligned with the center of gravity of the needle member and the needle supporting means, means rotating the supported needle member, and a cutter maintained in cutting relation closely adjacent one side of said needle member.

4. A sausage skinning apparatus having a needle member, means supporting said needle member for simultaneous rotation and reciprocation, a cutting disc, and means supporting said cutting disc for rotation in a plane parallel to that of said needle member with the cutting edge of said disc closely adjacent one side of said needle member.

5. A sausage skinning apparatus having a needle member, means supporting said needle member for simultaneous rotation and reciprocation, means yieldingly resisting movement of said needle member in a retracting direction, a cutting disc, and means supporting said cutting disc for rotation in a plane parallel to that of said needle member with the cutting edge of said disc closely adjacent one side of said needle member.

6. A sausage skinning apparatus having a needle member, means supporting said needle member for simultaneous rotation and reciprocation, a cutting disc, means supporting said cutting disc for rotation in a plane parallel to that of said needle member with the cutting edge of said disc closely adjacent one side of said needle member, and means supporting said needle member supporting means and said cutting disc supporting means for swinging movement about a common axis extending transversely of the direction of reciprocation of the said needle member.

7. In a sausage skinning machine, the combination comprising means providing a sausage supporting surface, means for continuously advancing a length of encased sausage links in a linear path over said supporting surface, a suction device arranged to act on the top surface of the casing as a length of links is advanced along said linear path and pivotally mounted for up and down movement relative to the supporting surface, a needle member for insertion between the casing and the sausage meat, support means carrying said needle member in position above the supporting surface with the longitudinal axis of said needle member aligned vertically with the linear path of the sausage links, a pivotal mounting for said needle member support means having its axis of pivoting perpendicular to said needle member, and means positively connecting said suction device and said support means to elevate said needle member in response to passage of sausage links under said suction device.

8. In a sausage skinning machine, the combination comprising means providing a sausage supporting surface, means for continuously advancing a length of encased sausage links in a linear path over said supporting surface, a suction device arranged to act on the top surface of the casing as a length of links is advanced along said linear path and pivotally mounted for up and down movement relative to the supporting surface, a needle member for insertion between the casing and the sausage meat, support means carrying said needle member in position above the supporting surface with the longitudinal axis of said needle member aligned vertically with the linear path of the sausage links, a pivotal mounting for said needle member support means having its axis of pivoting perpendicular to said needle member, and adjustable linkage connecting said suction device and said support means to elevate said needle member in response to passage of sausage links under said suction device.

9. In a sausage skinning machine, the combination comprising means providing a sausage supporting surface, means for continuously advancing a length of encased sausage links in a linear path over said supporting surface, a suction device arranged to act on the top surface of the casing as a length of links is advanced along said linear path and pivotally mounted for up and down movement relative to the supporting surface, a needle member for insertion between the casing and the sausage meat, support means carrying said needle member in position above the supporting surface with the longitudinal axis of said needle member aligned vertically with the linear path of the sausage links, a pivotal mounting for said needle member support means having its axis of pivoting perpendicular to said needle member, a cutter also carried by said support means and disposed at one side of the needle member, and means positively connecting said suction device and said support means to elevate said needle member and cutter together in response to passage of sausage links under said suction device.

10. In a sausage skinning machine, the combination comprising a sausage supporting surface over which the ratio of responsive movement. The end of the horizontal crank arm provides a slotted connection 142 with a pin 144 carried by the upper end of an ear 146 on the conduit arm 102 of the suction roll means 30.

The needle member 32, as seen best in Fig. 6, is in the form of a strong, round, steel rod of a length to extend from the discharge end of table 20 to beneath the suction opening 112 of the suction roll means 30. It has a sharply tapered point portion 148, the end of which is blunted, for entering the open end of a sausage casing. Intermediate its ends the needle member 32 is supported for sliding and rotation within a tubular bearing sleeve 150 lying beneath the pivotally mounted block 120 and projecting inwardly therefrom. This bearing sleeve 150 is supported by an upright slide piece 152 slidable in the forward end 154 of a horizontally movable slide block 156 fitting into the block 120 and having a stop abutment formation 158 to limit retraction.

The upright slide piece 152 is retained in a selected position of adjustment by a laterally binding set screw 160 as shown in Fig. 7. This adjustment is accomplished accurately by a hand turnscrew 162 carried in a lug formation 164 at the top of slide piece 152 and threaded into the exposed part of the slide block 156, as illustrated in Fig. 6. In similar manner another turnscrew 166 carried in an end plate 168 of block 120 threadedly engages the slide block 156 for horizontal or lengthwise adjustment of the needle member bearing sleeve 150. This horizontal adjustment is maintained by a set screw 170 threaded into the top of block 120 for engagement with the retracted part of slide block 156.

The needle member 32 may be pushed into the tubular bearing sleeve 150 against the yielding force of a loosely coiled spring 172 abutting an adjustable collar 174 carried by said member beyond the outer end of said sleeve, and an auxiliary bearing sleeve 176 supported by a bracket 178 secured to the end plate 168 by screws 180, 180 passing through vertical adjustment slots 182, 182 in the manner shown in Fig. 9.

As shown best in Figs. 1 and 6, the projecting head end of the needle member 32 has a double grooved pulley 184 keyed thereto for drive by a small high speed electric motor 186 mounted at one side thereof on the table 20. The motor 186 has an elongated drive pulley 188 mounted on its shaft in opposed parallel relation to the needle member pulley 184. A small belt 190 connects pulley 188 with one groove of the driven pulley 184. A shaft bracket 192 is mounted on table 12 on the opposite side of the needle member 32 with a shaft portion 194 supporting another elongated pulley 196 for rotation about an axis parallel to the rotational axes of pulleys 184 and 188 (Figs. 1 and 2). A second small belt 198 connects the other groove of driven pulley 188 with elongated pulley 196. A balanced drive of the needle member 32 is thus obtained and free rotation of said needle member as it moves back and forth in the aligned bearing sleeves 150 and 176 is insured.

The cutter or skin slitting means 34 comprises a high speed rotary cutting disc 200 with a thin cutting edge that may be either continuous or of other conventional cutting edge formation. The disc 200 is rotatably mounted in a conventional bearing assembly 202 carried by a forwardly and downwardly projecting arm 204 integral with the upright slide piece 152 adjusted by turnscrew 162 (Figs. 6 and 10). As shown best in Figs. 1 and 8, the cutter disc 200 is driven by a small high speed, table-mounted electric motor 206 through a flexible shaft 208 arranged to clear the adjacent feed belt 46. The flexibility of shaft 208 is sufficient to permit the up and down movement of the disc 200 as the block 120 pivots under the actuation of suction roll means 30, as previously explained.

The pivot axis of the mounting means 36 as defined by shafts 124, 124 is preferably approximately at or very slightly rearward of the center of gravity of the assembly including block 120, slide 152, slide block 156, needle member 32, and cutter 34, so that there will be little or no tendency for the point portion 148 of the needle member to jab and damage the sausage meat.

The important relations of the cutter disc 200 to the needle member 32 are clearly illustrated in Fig. 8. The disc 200 is slightly at one side of the needle member 32, with its axis of rotation perpendicular to that said member, and consequently perpendicular also to the line of feed of the sausage link string. Reverting to Fig. 6, the cutter disc 200 is preferably rotated toward the oncoming string of links, namely, counterclockwise as viewed in this figure. As further indicated in Fig. 8 the lower edge of the rotating cutter disc 200 extends approximately half-way down the thickness dimension of the needle member 32 and closely adjacent the side thereof at this point.

When the needle member 32 is rapidly rotated in a direction away from disc 200, that is, counterclockwise in Fig. 8, the needle member-separated skin or casing portion on the cutter side of said member will be placed in tension so that clean, sharp cutting will be always insured. The gripping of the casing by the feed belts 46, 46 anchors the corresponding side reacting against such tensile force.

Fig. 11 shows the details of a modified form of pivoted mounting means 36a that provides a yielding supporting means and a simpler mounting and arrangement for the needle rotating drive.

In this instance the mounting means 36a has its pivot shafts 124a carried by pivot arms 126a and rotatably mounted in movable supporting ears 122a, the depending rod portions 123a of which are supported above the table 20a by a pair of respective cylinder structures 210 (only one of which is shown) extending loosely through table opening 212. The lower end of each rod portion 122a has a piston 214 centered in its cylinder structure 210 by upper and lower coil springs 216 and 218 reacting against the opposite cylinder ends and opposite sides of the piston 214, which are provided with spring aligning bosses 220, 222. Above the table 20a, oppositely extending apertures plate 224 are engaged by upstanding studs 226, each of which is threadedly engaged by an upper nut 228 and a lower nut 230, clamping plates 224 between them. As will be apparent the cylinder structure and mounting permit the pivoting block 120a to yield upwardly and downwardly from a normal position of the pivot shafts 124a in a resistance accommodating manner. This upward movement is desirable when there are significant variations in the vertical dimensions of the links being fed. The threaded cylinder supporting studs 226, 226 provide for vertical adjustment of the horizontal pivot axis of block 120a for different sized sausages.

By mounting an electric motor 206a for driving the rotating needle member 32 on the top rear of the block 120a, a short, relatively non-flexible drive shaft 208a may be utilized, and a single, vertically running drive belt 190a may be used between pulleys 184a and 188a.

*Summary of operation and procedure*

It will be assumed that continuous lengths of encased links of sausage that have been cooked, smoked and otherwise treated are supplied successively to the feeding end of table 20 at a temperature low enough for efficient handling with the outer casing or skin in smooth pliable condition. Those lengths of links that have been formed by twisting will have been untwisted, and those that have been formed by twisted strings between the links will have had the strings removed. Various known means and procedures are available for these untwisting purposes, with which the present invention is only indirectly concerned. It will be sufficient to observe that the lengths are supplied untwisted and form a device that will hold back sufficiently to open quite fully the untwisted casing sections between the sections of sausage.

Under these conditions a length is introduced by an operator between the opposed belts 46, 46 (Fig. 1) at the pulleys 48, 48, with the casing severed and widely open at the end of the leading sausage link, after the manner shown in Fig. 12. This length of links is initially urged against the table 20 by the roller 74 and then lubricated by fluid as it passes through the hood 78 of means 28.

When the open end of the first link reaches the independently pivoted suction device 29, aperture 96 (Fig. 5) acts to lift the upper lip portion of the casing to a full open relation to the sausage itself, and also loosens the upper elemental part of the casing as it continues passage thereunder.

The lifting and loosening of the lengthwise top portion of the casing is continued by the suction opening 112 of the suction roll means 30 (Fig. 6). While the loose rolls 110 are passing over the top of this first, lengths of encased sausage links may be advanced in a linear path, a movably mounted contacting device arranged to act on the top surface of the casing as a length of links advances in said path and to move up and down in response to changes in the height dimension of said links, a rotatable needle member for insertion between the casing and the sausage meat, support means pivotally mounted for movement about an axis parallel to the supporting surface and rotatably carrying said needle member in perpendicular relation to said axis approximately horizontal above the supporting surface in spaced relation to said contacting device along the path of advance of lengths of links, means for rotating the needle member, a cutter carried by said support means in a position closely adjacent one side of said needle member, and means connecting said contacting device and said support means for regulating the elevation of said needle member.

11. In a sausage skinning machine, the combination comprising a sausage supporting surface over which lengths of encased sausage links may be advanced in a linear path, a movably mounted contacting device arranged to act on the top surface of the casing as a length of links advances in said path and to move up and down in response to changes in the height dimension of said links, a rotatable needle member for insertion between the casing and the sausage meat, support means pivotally mounted for movement about an axis parallel to the supporting surface and rotatably carrying said needle member in perpendicular relation to said axis approximately horizontal above the supporting surface in spaced relation to said contacting device along the path of advance of lengths of links, a rotary cutter carried by said support means in a position closely adjacent one side of said needle member, and adjustable linkage means positively connecting said contacting device and said support means for regulating the elevation of said needle member.

12. In a sausage skinning machine, the combination comprising a sausage supporting surface over which lengths of encased sausage links may be advanced in a linear path, a movably mounted contacting device arranged to act on the top surface of the casing as a length of links advances in said path and to move up and down in response to changes in the height dimension of said links, a rotatable needle member for insertion between the casing and the sausage meat, support means pivotally mounted for movement about an axis parallel to the supporting surface and carrying said needle member in perpendicular relation to said axis approximately horizontal above the supporting surface in spaced relation to said contacting device along the path of advance of lengths of links, a rotary cutter carried by said support means in a position closely adjacent one side of said needle member, and means connecting said contacting device and said support means for regulating the elevation of said needle member, said supporting surface being formed with an opening therethrough arranged to pass the links and casing downwardly as the casing is cut.

13. In a sausage skinning machine having a sausage link supporting surface, the combination comprising a block member having a forward end and a rearward end pivotally supported above the supporting surface for swinging movement about an axis parallel thereto, a slide block mounted for longitudinal movement on the block member and projecting from the forward end thereof, a slide piece movably mounted on the projecting portion of the slide block, tubular bearing means supported by the slide piece beneath the block member and extending perpendicularly to the pivot axis thereof, a needle member rotatably supported in the bearing means and having its point end projecting forwardly from the bearing sleeve, and means for rotating the needle member.

14. The combination of claim 13 including means for vertically adjusting the parallel pivot axis of said block member to accommodate different sizes of sausage links.

15. In a sausage skinning machine having a horizontal sausage link supporting surface, the combination comprising a block member having a forward end and a rearward end pivotally supported above the supporting surface for swinging movement about a horizontal axis, a horizontal slide block mounted for longitudinal movement on the block member and projecting from the forward end thereof, an upright slide piece movably mounted on the projecting portion of the horizontal slide block, a tubular bearing sleeve supported by the upright slide piece beneath the block member and extending perpendicularly to the horizontal pivot axis thereof, a needle member rotatably and reciprocably supported in the bearing sleeve and having its point end projecting forwardly, and its other end projecting rearwardly, from the bearing sleeve, abutment means intermediate the length of the needle member, depending abutment means joined to the block member, and resilient means acting against the abutment means of the needle member and said dependent abutment means to resist retraction of the needle member.

16. In a sausage skinning machine having a horizontal sausage link supporting surface, the combination comprising a block member having a forward end and a rearward end pivotally supported above the supporting surface for swinging movement about a horizontal axis, a horizontal slide block mounted for longitudinal movement on the block member and projecting from the forward end thereof, an upright slide piece movably mounted on the projecting portion of the horizontal slide block, a tubular bearing sleeve supported by the upright slide piece beneath the block member and extending perpendicularly to the horizontal pivot axis thereof, a needle member rotatably and reciprocably supported in the bearing sleeve and having its point end projecting forwardly, and its other end projecting rearwardly, from the bearing sleeve, means for rotating the needle member, abutment means intermediate the length of the needle member, depending abutment means joined to the block member, resilient means acting against the needle member abutment means and said depending abutment means to resist retraction of the needle member, cutter supporting means carried by the upper end portion of the upright slide piece and extending forwardly beyond the bearing sleeve, and a rotating cutter on the forward end of the cutter supporting means and positioned at one side of the needle member.

17. In a sausage skinning machine having a sausage link supporting surface, the combination comprising a block member having a forward end and a rearward end pivotally supported above the supporting surface for swinging movement about a horizontal axis, a horizontal slide block mounted for longitudinal movement on the block member and projecting from the forward end thereof, an upright slide piece movably mounted on the projecting portion of the horizontal slide block, a tubular bearing sleeve supported by the upright slide piece beneath the block member and extending perpendicularly to the horizontal pivot axis thereof, a needle member rotatably supported in the bearing sleeve and having its point end projecting forwardly, and its other end projecting rearwardly, from the bearing sleeve, and a cutter supported from the upright slide piece at one side of the point end of the needle member, the horizontal axis of rotation of the block member including said slide block, slide piece, bearing sleeve, needle member and cutter being approximately at the center of gravity.

References Cited in the file of this patent

UNITED STATES PATENTS

| Number | Name | Date |
|---|---|---|
| 1,631,723 | Freund | June 7, 1927 |
| 1,825,528 | Knudsen | Sept. 29, 1931 |
| 2,340,755 | Jacobson | Feb. 1, 1944 |
| 2,369,360 | Martin | Feb. 13, 1945 |
| 2,540,747 | McClure et al. | Feb. 6, 1951 |